United States Patent

[19]

Hoath

[11] Patent Number: 5,831,147
[45] Date of Patent: *Nov. 3, 1998

[54] TRACER GAS LEAK DETECTION WITH GROSS LEAK DETECTION BY MEASURING DIFFERENTIAL PRESSURE

[75] Inventor: Stephen D. Hoath, Eastbourne, England

[73] Assignee: The BOC Group plc, Windlesham, England

[*] Notice: The terminal 11 months of this patent has been disclaimed.

[21] Appl. No.: 388,943

[22] Filed: Feb. 14, 1995

[30] Foreign Application Priority Data

Feb. 18, 1994 [GB] United Kingdom .................. 9403184

[51] Int. Cl.$^6$ ...................................................... G01M 3/32
[52] U.S. Cl. ............................................. 73/49.3; 73/40.7
[58] Field of Search ............................... 73/40, 40.7, 49.3, 73/49.2 R

[56] References Cited

U.S. PATENT DOCUMENTS

| | | | |
|---|---|---|---|
| 2,467,767 | 4/1949 | Mertler ...................................... | 73/49.3 |
| 3,504,528 | 4/1970 | Weinerg et al. .......................... | 73/49.3 |
| 3,824,839 | 7/1974 | Briggs ....................................... | 73/40.7 |
| 3,837,228 | 9/1974 | Nemeth et al. ........................... | 73/40.7 |
| 3,855,844 | 12/1974 | Craig ........................................ | 73/40.7 |
| 4,858,463 | 8/1989 | Rosséet al. ............................... | 73/49.3 |
| 5,029,464 | 7/1991 | Lehmann .................................. | 73/49.3 |
| 5,131,263 | 7/1992 | Handke et al. ........................... | 73/40.7 |
| 5,170,660 | 12/1992 | Lehmann .................................. | 73/49.3 |
| 5,341,671 | 8/1994 | Baret et al. ............................... | 74/40.7 |
| 5,375,456 | 12/1994 | Burns ....................................... | 73/40.7 |

FOREIGN PATENT DOCUMENTS

| | | |
|---|---|---|
| 0 094 533 | 11/1983 | European Pat. Off. . |
| 0632 258 | 1/1995 | European Pat. Off. . |

OTHER PUBLICATIONS

Patent Abstracts of Japan, vol. 003 No. 021 (E–092) 21 Feb. 1979 and JP A 53 149379 (Hitachi Ltd 26 Dec. 1978 *abstract*.
Patent Abstracts of Japan vol. 012 No. 220 (P–270) 23 Jun. 1988 & JP A 63 015133 (Toshiba Corp) 22 Jan. 1988 *abstract*.
Patent Abstracts of Japan vol. 013 No. 332 (P–905) 26 Jul. 1989 & JP A 01 096525 (Toshiba Corp) 14 Apr. 1989 *Abstract*.

*Primary Examiner*—Michael Brock
*Attorney, Agent, or Firm*—David M. Rosenblum; Salvatore P. Pace

[57] ABSTRACT

A method and apparatus for leak testing an article in which an evacuable test chamber and a mass spectrometer leak detector are provided. The conduit links the test chamber and the mass spectrometer. A first valve is provided nearer the test chamber and a second valve is provided nearer the leak detector for controlling the flow through the conduit and for defining between the valves the trapped volume that is associated with the conduit. The trapped volume is evacuated with the first valve closed and the second valve opened. The pressure differential between the first point situated intermediate the first valve and the test chamber is measured and a second point situated intermediate the second valve and the leak detector is measured. The pressure differential between the first and second points is measured and a pressure differential reference point is determined. The second valve is closed to form the trapped volume and the first valve is opened to communicate the trapped volume and the evacuation chamber. The pressure differential between the first and second points is then measured and compared with the pressure differential reference point. The rate of change of the pressure differential is measured between the first and second points subsequent to the communication of the trapped volume and the test chamber. The second valve is opened to allow further evacuation purging of the chamber and the conduit.

7 Claims, 1 Drawing Sheet

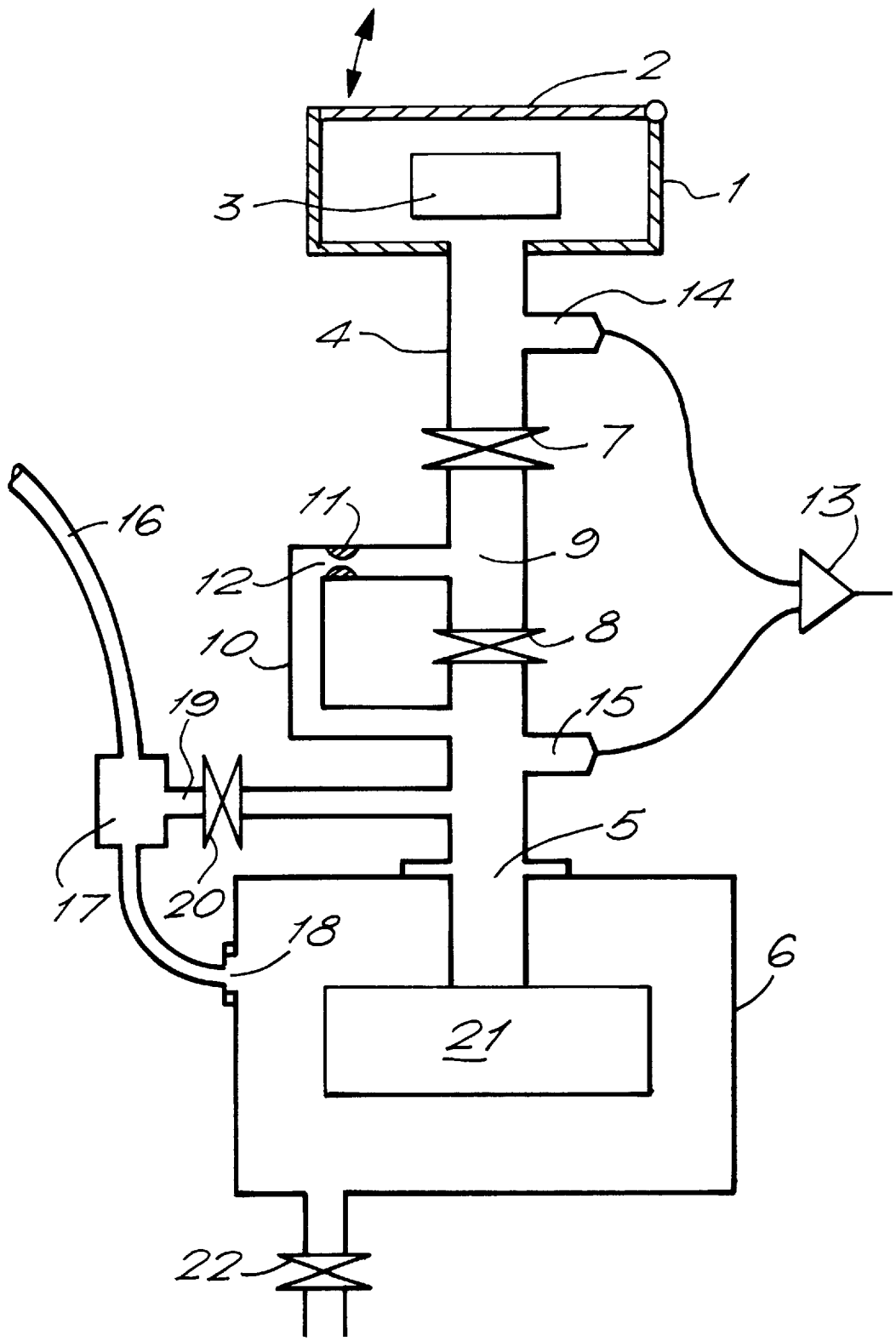

TRACER GAS LEAK DETECTION WITH GROSS LEAK DETECTION BY MEASURING DIFFERENTIAL PRESSURE

BACKGROUND OF THE INVENTION

This invention relates to methods and apparatus for the leak testing of articles and, more particularly to such methods and apparatus for use in sealed articles.

In the field of leak testing it is customary to fill the inside of a sealed test piece with a tracer gas, usually containing a significantly higher concentration of helium than found in normal air, and create a vacuum in a test chamber around the test piece. It is also customary to then, or simultaneously, expose a vacuum conduit from the test chamber to a helium leak detector which is designed to give a signal indicative of the amount of helium present or indicative of the equivalent leak rate corresponding to any helium which may be leaking from the test piece.

For leak testing sealed test pieces at high repetition rates for the test cycle, methods to avoid the build up of tracer gas contamination of the testing system are necessary in order to avoid erroneous rejections of test parts. Purging the test chamber and vacuum conduits with air or nitrogen gas between leak test cycles is common. Surprisingly, however, little attention has been paid to validating the tracer gas content of test pieces prior to testing for tracer gas leaks. Most leak testing production methods rely on using tracer gas leak detectors for either off-line batch sampling or complete testing of the production batch by non-tracer gas methods.

One of the ways to achieve the pressure differential across the test piece is to charge the inside of the test piece with the tracer gas. This can be done either during manufacture of the test piece or, alternatively, the test piece can be placed in a chamber and exposed to the test gas under high pressure. In the latter case, the high pressure differential forces the tracer gas into the test piece if there are any leaks in the test piece.

After the test piece has been charged by either of these means it is placed in the test chamber. When low pressure is created in the test chamber, tracer gas inside the test piece will pass into the chamber if there is any leak in the test piece. This approach for creating a pressure differential is applicable only to test piece items which are completely enclosed by the test chamber to form a hermetically sealed envelope, the only class of test pieces to which the present invention may be applied in full.

One of the worst problems with leak testing of such hermetically sealed items has been that any significant loss or dilution of the tracer gas content from the item prior to the leak testing can seriously compromise the test reliability in respect of specified low leakage rejection levels. This has frequently led to the adoption of two stages of leak testing for such items, such as those known as the "fine" and "gross" leak testing specifications, for example, for integrated circuits and small components; however, this causes inconvenience and cost and potential environmental damage. Another related problem which arises is that if the tracer gas content in the item is not substantially above that present in the surrounding atmosphere, the tracer gas detector will be unable to distinguish between good and bad test items.

An early process was to pump the vacuum conduit of the test chamber for sufficient time to create a very low pressure therein. The very low pressure is required because the leak detector is necessarily very sensitive and cannot be exposed to any appreciable pressure. After a sufficiently low pressure had been obtained in the vacuum conduit the leak detector was connected to the conduit. For badly leaking items this will remove the majority of the gas within the test piece, including the helium tracer gas available for subsequent detection. The leak detector would then give an initial high signal indicative of the normal partial pressure of helium in air present in the conduit plus the helium leaking through the test piece. Then as the conduit was continuously pumped to remove the air the signal would drop and finally indicate the equilibrium pressure of the leaking helium or the equivalent leak rate of helium then leaking from the test item. This was found to be a relatively unreliable and time-consuming process.

An improved prior approach is to sample the gases in the conduit on a continuous basis by means of one or more orifices or leakage paths between the conduit and the leak detector. These sampling methods divide the gas flow between the pump means of evacuation of the test chamber and the high vacuum measurement system of the leak detector and thereby reduce the sensitivity of the leak testing at the gain of a more rapid detection of larger leaks that might be diminished by the prior test methods that were more suited to measurement of rather small leaks. This method itself still relies on detecting the presence of tracer gas, but the evacuation times required for the loaded test chamber to reach a certain vacuum level or leak detection sensitivity mode are sometimes also used as a further check on badly leaking items. Leak rate determination by means of rate changes in falling total pressure requires that the sensors be gas independent, but most sensitive leak detectors incorporate gas dependent gauges with characteristics that cause reliability problems for this technique.

Another improved prior approach is momentarily to sample gas in the vacuum conduit through a small orifice between the vacuum conduit and the leak detector. However, even this approach is not completely satisfactory. One reason is that the flow through the orifice is extremely critical and subject to variation due, for example, to dirt in the orifice. In addition, it is generally necessary to include a valve between the orifice and the vacuum conduit so that the gas sample presented to the leak detector was chosen in the same way for each test. This meant that the valve had to be opened for each test at exactly the same time after pumping started and then closed at an exact time interval after opening. The exact timing of the valve operation is critical and is another source of practical difficulties.

In another prior approach, the conduit between the test chamber and the leak detector has two or more fixed volume-forming valves and an evacuation arrangement to provide a predetermined pressure of fluid, which can be trapped between the volume-forming valves, the leak detector being subject to damage by exposure to unrestricted flow of fluid. The process involves trapping a known volume and pressure of fluid, including any test fluid which may leak through the test piece, then communicating the fixed volume to the leak detector while preventing additional fluid from entering the fixed volume between the volume-forming valves. This approach has been devised to prevent overloading the leak detector and still relies on the presence of tracer gas for the leak detection.

SUMMARY OF THE INVENTION

The present invention is concerned with the provision of a method for leak testing an article providing one or more of: i) the detection of badly leaking items, ii) measurement of tracer gas leak rate for hermetically sealed items in particular and iii) detection of helium tracer gas from the items under test.

In accordance with the invention, there is provided a method for leak testing an article. The method comprises providing an evacuable test chamber, providing a means for evacuating the chamber and providing conduit means linking the chamber and the evacuating means. A first valve means is provided nearer the chamber and a second valve means is provided nearer the evacuating means for controlling flow through the conduit means and for defining therebetween a trapped volume associated with the conduit means. The trapped volume is evacuated with the first valve means closed and the second valve means open. A means is provided to measure the pressure differential between a first point situated intermediate the first valve means and the chamber and a second point situated intermediate the second valve means and the evacuation means. The pressure differential is measured between the first and second points and a pressure differential reference point is determined. The second valve means is closed to form the trapped volume and the first valve means is opened to communicate the trapped volume and the chamber. The pressure differential is measured between the first and second points and compared with the pressure differential reference point and the rate of change of the pressure differential between the first and second points subsequent to the communication of the trapped volume and the chamber. The second valve means is opened to allow further evacuation and purging of the chamber and the conduit means.

The trapped volume can suitably be simply that part of the conduit between the first and second valve means, or can be such a conduit in conjunction with a chamber or other volume associated therewith. Ideally, the trapped volume as a whole is between 0.5 and 2 times the net (or tare) volume of the test chamber, ie the internal volume of the chamber and that part of the conduit means between the first valve means and the chamber less the external volume of the test article.

Preferably, the method of the invention is performed in the sequential order recited above.

In general, the article to be leak tested can be inserted prior to the start of the method or at any time up to the measurement of the pressure differential reference point. It may in some circumstances be expedient to insert a dummy article of substantially the same size as the test article in to the trapped volume (but not blocking or interfering with the conduit 4 within the trapped volume) for the purpose of facilitating adjustment of the pressure differential reference point, when the external volume of the test article is altered deliberately, such as when different sizes of test articles are to be batch tested.

A most important feature of the invention is the capability rapidly to reject badly leaking test articles by comparison of the pressure differential with the pressure differential reference point as generated by the trapped volume in relation to the net volume and the internal volume of the test article. The method is sensitive to the quality of the seal between the chamber and its lid, with the important practical feature of not accepting test articles if the critical seal has failed. The method also relies on the reproducibility and the stability of the pressure differential measurement means. Variations in the external volume of the test article impose limits on the sensitivity to the internal volume of the test article.

Another important feature of the invention is to measure the rate at which the pressure differential is changing subsequent to the communication of the trapped volume and the interior of the chamber. This is to provide a reliable and effective comparison of the rate in conjunction with fully sealed articles and those articles with varying sizes of leaks; in the latter case the presence of gas from within the article would clearly increase the rate. This feature itself allows a basic leak test to be effected in accordance with the invention and a determination to be made of whether a small leak is present in the test article.

In addition to the method described above to identify the rate of change of pressure differential between the first and second points and thereby determine the likelihood of a small leak in the article or item being tested, the method of the invention preferably also includes means to detect the presence of any tracer gas leaking from test article placed in the evacuated test chamber. In such cases, it is essential for the articles under test to contain a tracer gas—preferably inserted in to the test articles relatively shortly before the method of the invention has begun—and for means to be provided to detect the presence of any tracer gas present in, or leaking from, the chamber as a result of any leak in the test article.

In preferred embodiments, therefore, the invention provides a two stage leak detection method comprising: i) a first stage in which any leak in the test article can be identified from a measurement of the pressure differential reference point and the rate of change of the pressure differential as described above, and ii) a second (optional) stage in which any leak not detected in the first stage can be identified by allowing the gas present in the test chamber to pass through the conduit and be evacuated in to a tracer gas detection means.

The detection means most preferably employed is a mass spectrometer of design and construction generally well known in the leak detection art. Generally, the mass spectrometer requires its own vacuum pump(s) to achieve the very low pressure necessary for its operation. In addition, the chamber evacuating means, commonly one or more vacuum pumps also, is also preferably associated with the detection means.

The above second stage of the preferred embodiments is preferably conducted substantially immediately after the first stage has been completed by opening both the first and second valve means and providing vacuum pump means, preferably one associated with a mass spectrometer tracer gas detection means, further to evacuate the test chamber and conduit and urge the gas in to detection means.

It is possible, however, in some cases preferable for the second stage to be performed, or started during the first stage, with the first valve closed and only the second valve open. This allows for the first stage of a test to be performed simultaneously with the second stage leak detection of an article.

Alternatively, a bleed of gas can be arranged around the second valve means, in particular if the first valve means has been opened and closed during the first stage of the preferred embodiments to allow gas from the trapped volume to communicate with a tracer gas detection means at the end of the first stage or, preferably, simultaneously with the first stage operation.

Such a bleed means may be introduced by providing a by-pass conduit around the second valve means having a very small overall internal cross-sectional area or, alternatively, a narrow construction within the conduit. In all cases, the by-pass should be arranged so as not to interfere with the operation of the method of the invention.

As an alternative to the by-pass, the bleed of gas may be effected by providing a small orifice in the valve member of the second valve means.

Supplementary means may also be employed in the method of the invention to detect the presence of any tracer gas present in the test article filling area of generally leaking from the test articles prior to or as they are being placed in the test chamber. This would tend to obviate in particular any potential for all the tracer gas to have been omitted or to have leaked from the article prior to conducting the method of the invention.

Ideally, the supplementary means comprises a separate probe associated with the detection means and employing a common evacuating means.

In accordance with a separate embodiment of the invention, there is provided apparatus for leak testing an article in accordance with the method of the invention, the apparatus comprising an evacuable test chamber for receiving the article and conduit means linking the test chamber and the tracer gas detection means. First and second valve means are provided for controlling flow through the conduit means and for defining therebetween a volume associated with the conduit means. A pressure differential sensing means is provided for detecting pressure variations in the conduit means between a first point situated intermediate the first valve means and the chamber and a second point situated between the second valve means and the tracer gas detection means. A controller means is utilized for ascertaining the rate of change of the pressure differential between the first and second points and comprising the rate of change with a predetermined rejection criteria.

Preferably, the apparatus also includes tracer gas detection means for additionally identifying any leakage of a tracer gas from the article, for example a mass spectrometer.

The tracer gas preferred for most leak detector applications and measurements, including the present invention, is helium. Although substantially pure helium gives the maximum sensitivity for the tracer gas detection, the helium may be mixed with air or nitrogen or argon in a known percentage by volume. When helium is used as the tracer gas, the leak detector is designed to detect only helium ions.

BRIEF DESCRIPTION OF THE DRAWING

To illustrate the invention, reference will now be made by way of exemplification only, to the accompanying DRAWING which shows a schematic view of a leak detection system according to the present invention with portions shown in section.

DETAILED DESCRIPTION OF THE DRAWING

As shown in the drawing, a leak detection system comprises a test chamber 1 with hinged or separable lid 2 so that a test piece 3 may be inserted into the chamber 1. The chamber 1 is designed so that when the lid 2 is closed a hermetically sealed envelope is formed around the test piece 3. The test chamber 1 is connected by a vacuum conduit 4 to the inlet 5 of a conventional mass spectrometer leak detector 6.

A conventional vacuum valve 7 is positioned to be able to open or close the test chamber from the conduit 4. A second conventional valve 8 is positioned adjacent to the conventional vacuum valve 7 to be able to open or close the leak detector 6 from the trapped volume 9 in the conduit 4. A bypass conduit 10 is positioned around valve 8 and contains a partition 11 with a small leak path 12 between the known volume 9 between the valves 7,8 and the leak detector inlet 5.

A differential pressure sensing system is connected into the conduit 4 between the test chamber 1 and the valve 7 at 14 and below the valve 8 at 15. The magnitude of the leak path 12 must not (unless the valve 7 is closed) deplete the pressure in the volume 9 any faster than the resolution limit for measuring differential pressure rate using sensor connections at locations 14 and 15. A viscous sniffer probe 16 is connected to a header volume 17 pumped by the viscous flow probe port 18 of the leak detector 6. The header volume 17 is separated from the leak detector port 5 by a viscous flow probe filter 19 and a valve 20.

In general, it is preferable for the net (tare) volume of the chamber 1 plus the conduit 4 above (as shown) the valve 7 plus the trapped volume to be significantly smaller than the main manifold area 21 of the leak detector 6 plus the conduit 4 beneath (as shown) the valve 8. However, if in performing a leak test, the valve 7 is closed, which is generally preferable, then it is preferable for the trapped volume 9 itself to be significantly smaller than the main manifold area 21 plus the conduit 4 beneath (as shown) the valve 8. This enables the leak detector to continue with conventional mass spectrometer leak testing directly into its sensitive mode without damaging it, and avoids further significant pumping time requirements for the subsequent (first stage) test on the next article.

A valve 22 within the leak detector 6 allows purging of the manifold 21, inlet 5, conduit 4, trapped volume while also venting the test chamber 1 to allow unloading the test piece 3 through the hinged or separable lid 2 after testing.

The apparatus disclosed in the drawing operates as follows: while the leak detector 6 is being made ready to function as a conventional mass spectrometer leak detector, the purge state has the valves 7 and 8 and 22 open and valve 20 closed, and within the leak detector 6 internal vacuum pumps will clear residual helium from the tracer gas measuring system. The viscous probe 16 may be continuously pumped by the leak detector 6 via the viscous header 17 and the viscous port 18 to detect the presence of tracer gas, for example helium, at for example, the test article filling stage.

The valves 7 and 22 then close and valve 20 opens as the leak detector 6 starts to evacuate manifold 21 and thereby conduit 4, differential sensor port 15 and trapped volume 9 and bypass 10 in preparation for the helium leak test and can pump the header 17 via viscous filter leak 19. The leak detector 6 rapidly reaches a sensitive leak test mode for the validation of helium supply using the viscous probe 16. At this point the leak detector will be prepared to the detection of the helium from trapped volume 9 by closing valve 20 and allowing the signal to die away.

The test piece 3 is added to the chamber 1 and the lid 2 closed. At this time the differential port 14 will have been raised slightly above the local atmospheric pressure due to the sealing of lid 2 to the test chamber 1. The differential pressure ports 14 & 15 are used to determine the starting pressure of the net volume comprising the volume in conduit 4 above valve 7 and the volume of the test chamber 1 excluding the volume of test piece 3. This ensures that there is a minimal dependence on actual atmospheric pressures, transducer variations and temperature variations.

For the first stage leak detection (without use of tracer gas), the valve 8 is closed then the valve 7 is opened—the net volume is now larger so that there is an immediate pressure step recorded by the differential sensor at port 14. For a badly leaking test piece 3, the pressure step will be less than for a well sealed test piece 3 of the same external dimensions because of the additional contribution of gas from the internal volume of the badly leaking test piece 3 into the total gas quantity above valve 8.

This test takes typically less than one second for volumes of order 10 cm³. If the test piece 3 leaks more slowly on this timescale of testing, the pressure slope determined from the time variation of the sensor at port 14 can also be processed within one or two seconds and would be proceeded by a pressure step about equal to that associated with a good test piece 3.

The sensitivity of this rate of change of pressure differential test can be improved by closing the valve 7 during the first stage of the method of the invention. If the valve 7 is closed, then the bypass 10, or the direct route with the valve 8 open, may be used to sense for tracer gas. The bypass 10 allows helium leakage to be detected, so that if leakage from the test piece 3 is not too great, but also above that corresponding to the total pressure sensing limits or the helium sensing limits, there would be two checks on the quality of the test piece 3.

For the system disclosed, these limits are about 0.01 and 0.001 atmospheric cm³/second respectively when the pressure differential across the test piece 3 between its inner volume and the test chamber 1 is typically half of one atmosphere, and the volumes are typically 10 cm³ each.

When a test piece 3 passes these tests, valve 8 opens to permit the second stage to proceed, ie the normal leak testing by the leak detector 6; because of the much larger volume of the manifold 21, valve 8 opens directly into the sensitive detection mode of the leak detector 6. The leak detector 6 experiences a momentary pressure surge, which will be limited by choked flow conditions within internal components used to sample the gas entering the inlet 5, and the more sensitive helium leak rate measurement can be completed within a further two seconds, typically for leaks of about 0.00001 atmosphere cm³/sec.

Completion of the test will be followed by isolation of manifold 21 from the internal pumps of the leak detector 6 and then opening of the valve 22, which raises the pressure in the test chamber 1 until the lid 2 can be opened for removal of the test piece 3 and a return to the purge state.

Clearly, the above sequence can be operated manually or automatically—the gain for automatic leak testing using a conventional leak detector 6 is that the normal leak testing pump-down is only extended for the time to take readings from the differential sensor pair and to open valves 7 & 8.

Unlike a conventional leak detection system, the present invention involves a pre-evacuation stage, which can take place prior to the test piece being loaded into the test chamber 1 and which may take typically three seconds, and the measuring stages, which take between typically four or five seconds. Arranged as a sequential system, the test chamber pump-down and measurements would take typically seven or eight seconds, clearly a much slower arrangement. Thus the present invention provides a means whereby test cycle times can be kept short despite the three additional tests, the detection and rejection of 1) badly leaking and 2) slightly leaking test articles through use of the trapped volume method and 3) validation of helium supply using the supplementary means.

In general the apparatus of the invention can be such that the mass spectrometer is used as a separate unit to the remainder of the apparatus, ie as shown in the drawing; alternatively, it would of course be possible for some or all of the remainder of the apparatus to be included in a mass spectrometer leak detector housing, for example test chamber 1 is the test chamber of the mass spectrometer leak detector.

I claim:

1. A method for leak testing an article, the method comprising;

placing the article within an evacuable test chamber;

providing means for evacuating the chamber;

providing conduit means linking the chamber and the evacuating means;

providing a first valve means and a second valve means for controlling flow through the conduit means and for defining therebetween a trapped volume associated with the conduit means the first valve means being located between the chamber and the trapped volume, the second valve means being located between the trapped volume and the evacuating means;

evacuating the trapped volume with the first valve means closed and the second valve means open;

providing means to measure the pressure differential between a first point situated intermediate the first valve means and the chamber and a second point situated intermediate the second valve means and the evacuation means;

measuring the pressure differential between the first and second points and determining a pressure differential reference point;

closing the second valve means to form the trapped volume;

opening the first valve means to communicate the trapped volume and the chamber;

measuring the pressure differential between the first and second points and comparing it with the pressure differential reference point;

measuring the rate of change of the pressure differential between the first and second points subsequent to the communication of the trapped volume and the chamber; and opening the second valve means to allow further evacuation and purging of the chamber and the conduit means.

2. The method according to claim 1 in which the trapped volume is between 0.5 and 2 times the net volume of the test chamber.

3. The method according to claim 1, wherein:

a first stage of the method comprises identifying a leak in the test article can be identified from a measurement of the pressure differential reference point and the rate of change of the pressure differential; and a second stage of the method comprises identifying the leak by allowing the gas present in the test chamber to pass through the conduit and be evacuated in to a tracer gas detection means.

4. The method according to claim 3 in which the tracer gas detection means is a mass spectrometer.

5. The method according to claim 1 in which a bleed of gas is arranged around, or within, the second valve means.

6. The method according to claim 1 in which supplementary means are employed to detect the presence of any tracer gas present outside of the test chamber.

7. The method according to claim 6 in which the supplementary means is a separate probe associated with a tracer gas detection means.

* * * * *